(12) United States Patent
Kreiner et al.

(10) Patent No.: US 7,826,465 B2
(45) Date of Patent: Nov. 2, 2010

(54) METHODS, SYSTEMS AND COMPUTER PROGRAM PRODUCTS FOR DYNAMIC COMMUNICATION DATA ROUTING BY A MULTI-NETWORK REMOTE COMMUNICATION TERMINAL

(75) Inventors: Barrett Kreiner, Woodstock, GA (US); Edgar Shrum, Jr., Smyrna, GA (US); Steven Wright, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 268 days.

(21) Appl. No.: 11/867,147

(22) Filed: Oct. 4, 2007

(65) Prior Publication Data

US 2009/0092142 A1    Apr. 9, 2009

(51) Int. Cl.
*H04L 12/56* (2006.01)

(52) U.S. Cl. .................. 370/401; 370/316; 370/400; 455/452.1; 455/450

(58) Field of Classification Search ......... 370/312–316, 370/400; 455/450, 452.1; 707/10
See application file for complete search history.

(56) References Cited

U.S. PATENT DOCUMENTS

| | | | |
|---|---|---|---|
| 6,259,705 B1 | 7/2001 | Takahashi et al. | 370/465 |
| 6,580,715 B1 | 6/2003 | Bare | 370/396 |
| 6,985,454 B1 * | 1/2006 | Wiedeman et al. | 370/316 |
| 6,987,735 B2 | 1/2006 | Basso et al. | 370/238 |
| 7,519,370 B2 * | 4/2009 | Febvre et al. | 455/450 |
| 2003/0002443 A1 | 1/2003 | Basso et al. | 370/237 |
| 2003/0120658 A1 * | 6/2003 | Carneal et al. | 707/10 |
| 2005/0250508 A1 * | 11/2005 | Guo et al. | 455/452.1 |
| 2007/0019602 A1 | 1/2007 | Wong et al. | 370/343 |
| 2007/0030857 A1 | 2/2007 | Fulknier et al. | 370/401 |
| 2007/0110080 A1 * | 5/2007 | Bennett | 370/400 |

OTHER PUBLICATIONS

TCP/IP Reference Page, TCP/IP Protocols: ICMP UDP FTP HTTP Reference Page, http://www.protocols.com/pbook/tepipl.htm, pp. 1-4, 2005.
Internet Protocols, http://www.cisco.com/univered/ee/td/doc/cisintwk/ito_doc/ip.htm, Cisco Systems Inc, pp. 1-18, Dec. 14, 2005.

* cited by examiner

*Primary Examiner*—Man Phan
*Assistant Examiner*—Mohamed Kamara
(74) *Attorney, Agent, or Firm*—Myers Bigel Sibley & Sajoec

(57) ABSTRACT

Methods, systems and computer program products of dynamic communication data routing by a multi-network remote communication terminal across a plurality of networks are provided. The multi-network remote communication terminal is delivered to a locality to receive communication services. The terminal is communicatively connected to a first network, a second network, the second network having a communication characteristic different from the first network, and to a user endpoint device positioned in the locality. Communication data directed to a target device from the user endpoint device is received at the terminal. A characteristic of the received communication data is determined. Routing of received communication data to the target device is allocated across the first network and/or the second network based on the determined characteristic of the received communication data and the communication characteristics of the first and second network. Routing of the received communication data is dynamically re-allocated based on a detected change in the characteristic of the communication data.

17 Claims, 6 Drawing Sheets

METHODS, SYSTEMS AND COMPUTER PROGRAM PRODUCTS FOR DYNAMIC COMMUNICATION DATA ROUTING BY A MULTI-NETWORK REMOTE COMMUNICATION TERMINAL

BACKGROUND

The present application generally relates to the field of data communications and, more particularly, to data routing.

It is common to connect a plurality of systems and devices through a communication medium often referred to as a network. Such networks among communicating devices permit devices (or users of devices) to easily exchange and share information among the various devices. The Internet is a presently popular example of such networking on a global scale. Individual users attach their devices to the Internet, thereby enabling sharing of vast quantities of data on other devices geographically dispersed throughout the world.

Networked computing systems may be configured and graphically depicted in a wide variety of common wired and/or wireless topologies. In other words, the particular configurations of network communication links (also referred to as paths) and devices (e.g. routers, switches) between a particular pair of endpoint node devices wishing to exchange information may be widely varied. Any particular connection between two endpoint node computers attached to a network may be direct or may pass through a large number of intermediate devices in the network. In addition, there may be a plurality of alternative paths through the network connecting any two network devices. Different groupings of the devices and paths may be administered by different network administrators. Each administrator may establish one or more domains grouping the devices and links of the network they administer.

Many present network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier that is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

A variety of different protocol layers are provided in various packet communication protocols, such as TCP/IP. At the lowest level of network communication, the addresses in packets may be often referred to as MAC address (Media Access Control address). Network protocol layers above this lower layer of communication protocol may use other addresses for other purposes in the higher layer. In most network low level communication levels, operable on the physical link medium, an address is referred to as a MAC address, while higher layers may use an assigned internet protocol (IP) address associated with the device MAC address.

In many present commercially available network environments, the network communication medium is in essence a bus commonly attached to a plurality of devices over which the devices exchange communications. In a simple networking topology, all devices may be attached to a bus structured common network medium. Any particular single network medium generally has a maximum data exchange bandwidth associated therewith. The maximum data exchange bandwidth of a medium may be determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards presently range from approximately 10 Mbit (million bits of information) per second to 10 Gbit per second. Therefore, a single (slow) Ethernet connection, for example, may have maximum data exchange bandwidth of approximately 10 Mbit per second.

A wide variety of wired and/or wireless network access points may be accessible from a given area, including cellular networks, satellite networks and the like. However, a user endpoint device may not be configured to exchange communications using some or all of these access points and, as such, may not be able to access the wide area network or only have low speed access from a given locality, particularly where an event has occurred that has removed a network access point generally used by the user endpoint device. For example, following a natural disaster, both ground based wireless and wired connection points may be lost and most user endpoint devices in the locality may not be configured to use a still available satellite based network access point.

SUMMARY

Embodiments of the present invention include methods of dynamic communication data routing by a multi-network remote communication terminal across a plurality of networks. The multi-network remote communication terminal is delivered to a locality to receive communication services. The terminal is communicatively connected to a first network, a second network, the second network having a communication characteristic different from the first network, and to a user endpoint device positioned in the locality. Communication data directed to a target device from the user endpoint device is received at the terminal. A characteristic of the received communication data is determined. Routing of received communication data to the target device is allocated across the first network and/or the second network based on the determined characteristic of the received communication data and the communication characteristics of the first and second network. Routing of the received communication data is dynamically re-allocated based on a detected change in the characteristic of the communication data.

In other embodiments, the first and second network are wireless networks. The first network communication characteristics include a high downstream bandwidth from the target device to the user endpoint device, a low upstream bandwidth from the user endpoint device to the target device and a high latency. The second network communication characteristics include a low upstream and downstream bandwidth and a low latency. Determining a characteristic of the received communication data includes determining a latency tolerance and a bandwidth requirement of the received communication data. Allocating routing may include routing a request for a multi-media file download from the user endpoint device to the target device to the first network responsive to determining that the received communication data comprises a request for a multi-media file download. Dynamically re-allocating may include re-allocating the received communication data to the second network responsive to determining that the received communication data has a low latency tolerance.

In further embodiments, allocating routing includes routing a request for a multi-media file download from the user endpoint device to the target device to the first network responsive to determining that the received communication data comprises a request for a multi-media file download. The method further includes receiving the requested multi-media file download from the target device on the first network and routing the received multi-media file download to the user endpoint device. Routing the received multi-media file download may be preceded by storing the received multi-media file download on a memory device of the terminal and delaying delivery of the received multi-media file to the user endpoint device to allow delivery to the user endpoint device at a communication rate exceeding the download rate of the multi-media file on the first network.

In other embodiments, determining the characteristic of the received communication data includes detecting the characteristic based on implicit information and/or explicit information. Detecting the characteristic based on explicit information may include detecting known packet markings of the received communication data, Ethernet priority bits of the received communication data, internet protocol (IP) differentiated class of service code points of the received communication data and/or locally significant code points of the received communication data defined by the terminal. Detecting the characteristic based on implicit information may include detecting flow characteristics of packets of the received communication data and/or packet rates of the received communication data.

In yet further embodiments, determining the characteristic of the received communication data includes identify the user endpoint device generating the communication data, retrieving previously defined information defining the usage characteristics of the identified user endpoint device and allocating routing based on the retrieved previously defined information. The method may further include generating information defining the usage characteristics of the user endpoint device based on communication data received from the user endpoint device over time and retrieving previously defined information may include retrieving the generated information.

In further embodiments, dynamically re-allocating further includes re-allocating routing of the received communication data responsive to a determination of bandwidth availability on the first and/or second network. A change in the bandwidth availability of the first and/or second network may be detected. Detecting a change in the bandwidth availability may include detecting loss of access to the first and/or second network and the method may further include identifying an available alternative network in the locality and communicatively connecting the terminal to the identified alternative network.

In other embodiments, delivering the multi-network remote communication terminal includes determining a geographic region has had a loss of communication services, segmenting the geographic region into a plurality of localities, each of which is sized to be serviced by a single multi-network remote communication terminal and delivering a multi-network remote communication terminal to each of the localities. Communicatively connecting the terminal to the user endpoint device may include communicatively coupling the terminal to a plurality of user endpoint devices positioned in the locality and receiving communication data may include receiving communication data from the plurality of user endpoint devices. Allocating routing may be preceded by grouping data from different ones of the plurality of user endpoint devices based on determined characteristics of the communication data from respective ones of the plurality of user endpoint devices.

In further embodiments the terminal exchanges control information with the target device to allocate the flow of communication data sent to the user endpoint device responsive to transmission of the communication data from the user endpoint device to the first and/or second network based on the communication characteristics of the first and second network and characteristics of the flow of communication data sent to the user endpoint device responsive to transmission of the communication data from the user endpoint device. The method may further include receiving a first portion of responsive communication data at the terminal over the first network, receiving a second portion of the responsive communication data at the terminal over the second network, reassembling the first and second portions to provide the responsive communication data and transmitting the responsive communication data from the terminal to the user endpoint device.

In yet further embodiments, multi-network remote communication terminals are provided including a portable housing. The terminals include a first network interface to a first network access point in the housing, a second network interface to a second network access point in the housing, the second network having different communication characteristics than the first network, and a local network interface configured to detect a plurality of user endpoint devices coupled to the local network. A processor of the terminals is configured to determine a characteristic of communication data received from the user endpoint devices and to allocate routing of communication data across the first network and the second network based on the determined characteristic of the communication data and the communication characteristics of the first and second network and to dynamically re-allocate the communication data based on a detected change in the characteristic of the communication data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EMBODIMENTS OF THE INVENTION

Figure 1:
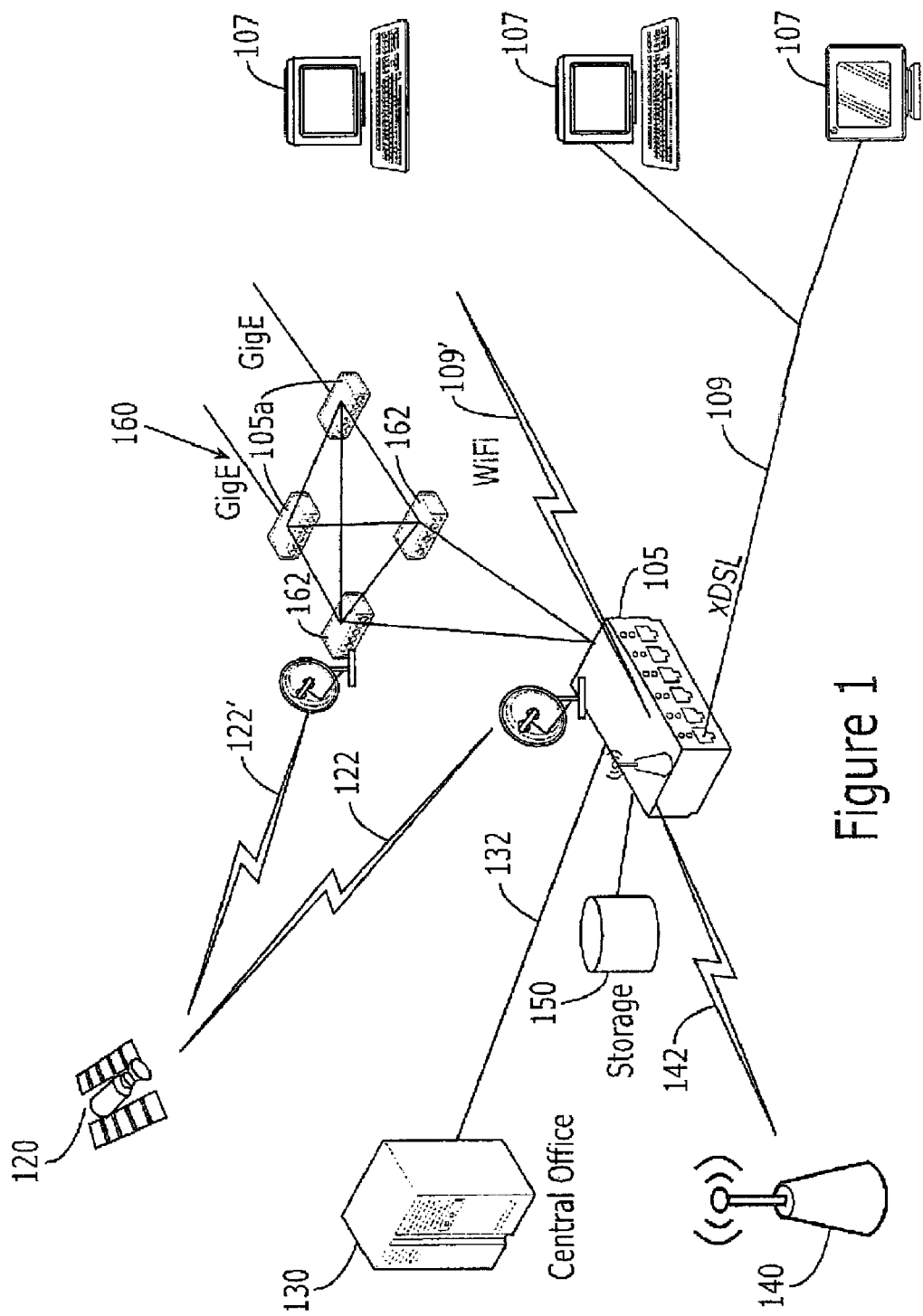
FIG. 1 is a schematic block diagram of a communication system according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. Note that references to a computer herein include any network attachable device.

The computer-usable or computer-readable medium may be, for example but not limited to, an electronic, magnetic, optical, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Some embodiments of the present invention will now be described with reference to the schematic block diagram illustration of FIG. 1. As shown in the embodiments of FIG. 1, a multi-network remote communication terminal 105 may be delivered to a geographic locality to provide access to, and dynamic communication data routing for, one or more user endpoint devices 107 positioned in the locality of the multi-network remote communication terminal 105. The remote communication terminal 105 may be coupled to local user endpoint device(s) 107 by a wired link 109, such as a xDSL based link and/or a wireless link 109', such as a WiFi protocol communication link.

The remote communication terminal 105 may leverage connectivity to multiple upstream networks to provide a homogeneous service experience to user endpoint devices 107 as if the remote communication terminal 105 had a single high speed (GigE/Fiber) connection. As illustrated in the exemplary embodiments of FIG. 1, the upstream network access points include a satellite network access point 120 to which a link 122 may be established, a wired access line to a central office 130 of a communication network through a link 132 and a terrestrial wireless network access point 140 through a link 142. The satellite link 122 may be characterized as having a high downstream bandwidth, a low upstream bandwidth and being most suited to latency tolerant traffic given the characteristics of the satellite uplink. The satellite link 122 may further be suited to linear video distribution or the like of multi-media files using the high downstream bandwidth characteristics of the satellite link 122. The central office link 132 may typically be characterized as a low bandwidth, low latency, low packet loss land line network connection, such as a T1, ISDN or the like. Application uses by the user endpoint device 107 suitable for such network characteristics may be, for example, gaming. The terrestrial wireless network link 142 may be characterized as having a low bandwidth and a potentially higher packet loss than the land line link 132. Examples of protocols for such terrestrial wireless network links 142 include 3G, WiMAX, GPRS, HSPDA and/or the like. Such a link may be suited, for example, to web-surfing or the like.

Also illustrated in the embodiments of FIG. 1 are a storage device 150 coupled to the remote communication terminal 105 and a meshed network 160 of other remote communication terminals 105a or other network devices 162 also coupled to the remote communication terminal 105. One or more of the meshed network devices 105a, 162 may be coupled directly to one or more of the upstream networks as illustrated by the satellite link 122' to the satellite network access point 120. The meshed network 160 may be a high speed wired network, such as a GigE protocol network.

In some embodiments, the remote communication terminal 105 may be used to provide access to bandwidth to remote sites. In various embodiments, the remote communications terminal 105 may provide for dynamic summing of resources across a plurality of networks and route traffic based on endpoint device requirements and network capabilities. Examples of such requirements include latency, packet loss, bandwidth and the like. As a result, one of the user endpoint devices 107 in the locality may provide a communication experience similar to a high bandwidth connection experience in accessing a wide area network. In addition, some communication packets could be transmitted multiple times on different paths to address risk of loss and the like or high priority packets. The remote communication terminal 105 may be delivered to a fixed locality and/or provided as a mobile unit positioned in telecommunications company service trucks or the like that may be moved within a geographic region based on requirements and conditions at a given time.

Various embodiments include a variety of approaches for communication routing, such as a satellite network for downlink communications and an alternative network for uplink communications. Also, in addition to the remote communications terminal 105 being configured to determine routing for uplink communications, the remote communication terminal 105 may communicate through the respective network access points to negotiate and/or select a designated routing for return responsive downlink communications from target devices on the networks. Remote communication terminal 105, in some embodiments, may be a small, disposable units and may be solar powered, for example, where used in areas with limited access to other power sources. Provided services may include providing telecommunications services using a voice over IP (VOIP) protocol as well as general internet protocol packet communications. The routing of packets may include switching networks used for communication transmissions midstream for a communication session with a respective user endpoint device 107. Dynamic apportionment may be based on needs such as bandwidth and the like and/or through utilization of a rules (logic) engine (e.g., routing module 250 shown in FIG. 2) making such dynamic determinations. The rules engine may be utilized in a manner that includes obtaining and updating knowledge related to bandwidth availability and the like on the respective communication networks available to the remote communication terminal 105. In addition, the meshed network 160 may allow a tier structure for distribution of content from respective ones of the remote communication terminals 105, 105a to each other as needed.

A variety of approaches to detecting a characteristic of received communication data for use in routing by the remote communication terminal 105 will be described further herein. Such approaches may include implicit and/or explicit approaches. In addition, predetermined characteristics of particular user endpoint devices 107 may be utilized in the routing. For example, a particular user endpoint device 107 may predominantly be used for gaming applications while another may be used for latency and loss tolerant activities, such as websurfing, and further for high bandwidth applications, such as downloading of multi-media files. Such characteristics may be learned in some embodiments by the remote communication terminal 105 or be provided by a further information source independent of the assessment of actual communication packets passing through the remote communication terminal 105 from the respective user endpoint devices 107.

As noted previously, the mass storage device 150 may be locally coupled to the remote communication terminal 105 so that downloaded communication data may stored on the device 150 for subsequent delayed delivery to the user endpoint devices 107. Thus, by prestoring information, such as multi-media files, high speed delivery in a local vicinity over the links 109, 109' may be provided, even where less bandwidth is available on the incoming links 122, 132, 142, by first buffering downloaded data into the storage device 150. Transmission may be delayed selectively based on respective available bandwidths for incoming and outgoing downloaded responsive communication data and/or delivery may be scheduled for a time certain in the future by a particular user endpoint device 107. It will be understood that a variety of communication techniques may be used for the communication connections to the remote communication terminal 105, including multiple antenna communication ports using spatial diversity reception, wired interfaces, steered beam antennas and beam shaping, which particular techniques for improving communication performance will not be further described herein.

Figure 2:
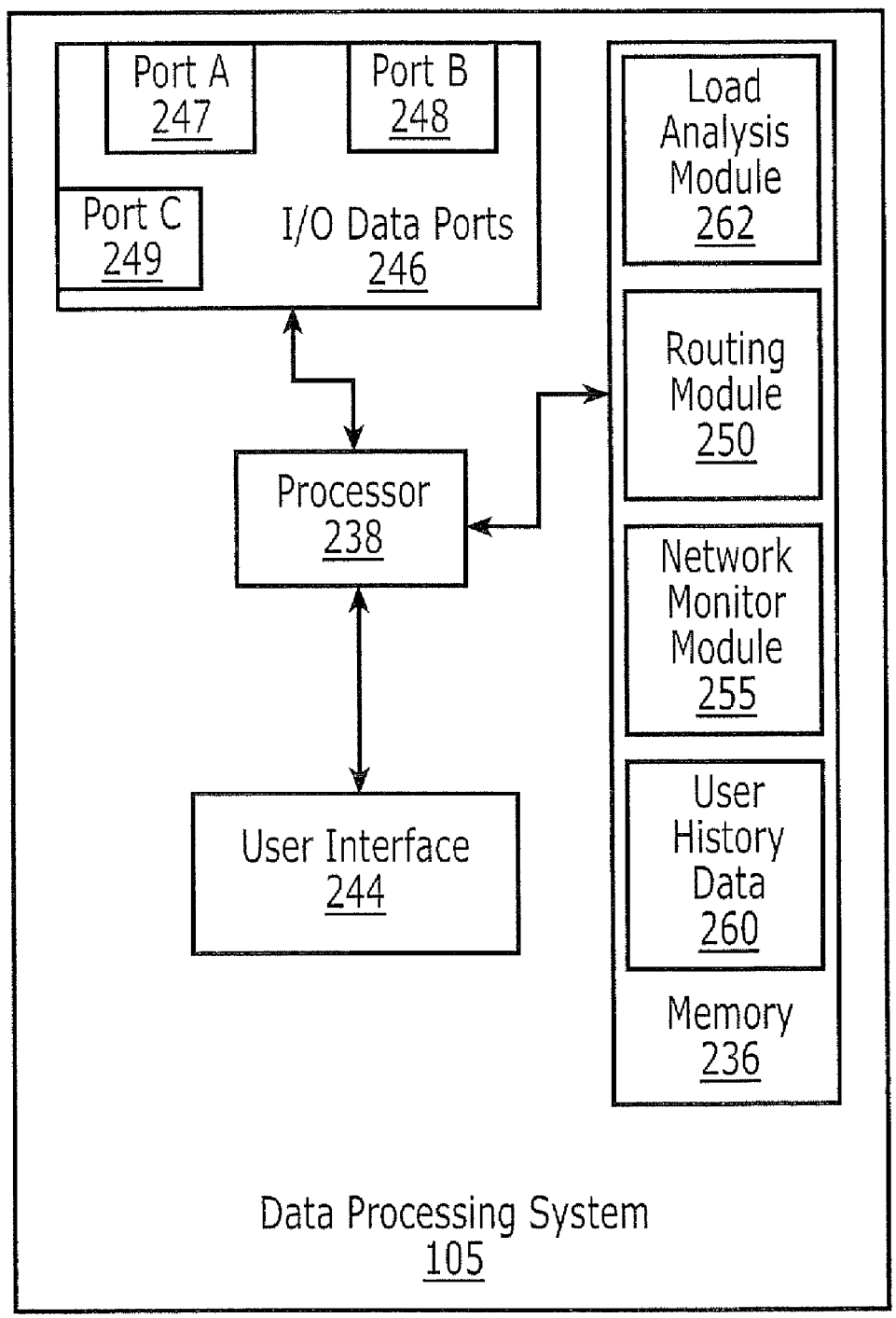
FIG. 2 is a block diagram of a data processing system suitable for use as a multi-network remote communication terminal in some embodiments of the present invention.
Figure 3:
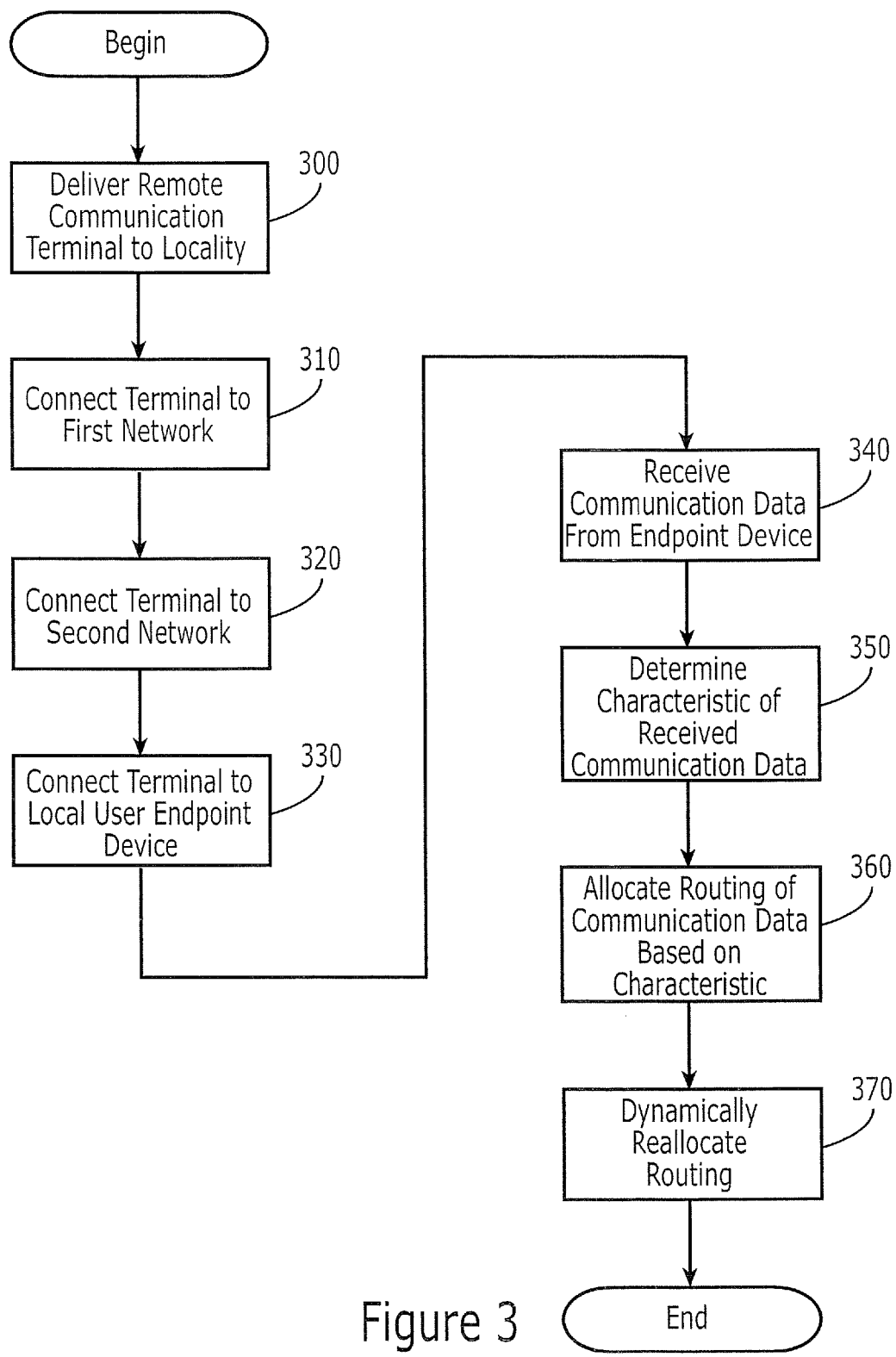
FIGS. 3-6 are flowcharts illustrating operations for dynamic communication data routing by a multi-network remote communication terminal across a plurality of networks according to some embodiments of the present invention.

Referring now to FIG. 2, an exemplary embodiment of data processing systems, for example, a personal computer system or the like, configured as the multi-network remote communication terminal 105 in accordance with some embodiments of the present invention will be discussed. The remote communication terminal 105, which may be incorporated in, for example, a personal computer, a PDA, a wireless terminal/phone, or the like, may include a user interface 244, including, for example, input device(s) such as a keyboard or keypad, a display, a speaker and/or microphone, and a memory 236 that communicate with a processor 238. The remote communication terminal 105 may further include I/O data ports 246 that also communicates with the processor 238. The I/O data ports 246 can be used to transfer information between the remote communication terminal 105 and another computer system or networks that may be associated with a communications service provider or user communication devices using, for example, an Internet Protocol (IP) connection. These I/O data ports 246 may be conventional components such as those used in many conventional data processing systems, which may be configured to operate as described herein. Thus, as shown in FIG. 2, the I/O data ports 246 may include a first network interface (Port A) 247 and a second network interface (Port B) 248 that may communicatively connect the remote communication terminal 105 to the satellite network link 122, the central office wired link 132 and/or the terrestrial wireless network link 142, respectively. The illustrated I/O data ports 246 are further shown as including a local network interface (Port C) 249 that may communicatively connect the remote communication terminal 105 to the wireless and/or wired links 109, 109' so as to communicatively connect the remote communication terminal 105 to the user endpoint device(s) 107 positioned in the locality of the remote communication terminal 105.

As shown in the embodiments of FIG. 2, the memory 236 includes a load analysis module 262, a routing module 250, a network monitor module 255 and user history data 260. The load analysis module 262 is configured to determine a characteristic of communication data received by the remote communication terminal 105 from the user endpoint devices 107. The routing module 250 is configured to allocate routing of the communication data across multiple networks using links 122, 132, 142 based on the determined characteristics of the communication data and communication characteristics of the respective networks including the links 122, 132, 142. The routing module 250 is further configured to dynamically re-allocate the communication data based on a detected change in the characteristic of the communication data from a respective user endpoint device 107. Such a dynamic re-allocation may occur midstream in a communication from a respective user endpoint device 107 or as result of a transition in characteristics between sessions for the particular endpoint user device 107.

A variety of different characteristics may be detected by the load analysis module 262 in various embodiments of the present invention. For example, respective first and second networks coupled to the remote communication terminal 105 may be wireless networks. A first of the networks may have communication characteristics, such as a high downstream bandwidth from a communication target device to the user endpoint device 107, a low upstream bandwidth from the user endpoint device 107 to the target device and high latency. For example, such characteristics are typically associated with a satellite network. The second wireless network communication characteristics may include a low upstream and downstream bandwidth and a low latency, such as may be found with wired links through the central office 130. The load analysis module 262 may be configured to determine a latency tolerance and a bandwidth requirement of received communication data from the user endpoint device 107 for use in selecting between the respective first and second wireless networks. For example, the routing module 250 may allocate routing of a request for a multi-media file download from the user endpoint device 107 to the target device over the satellite network responsive to determining the received communication data is a request for a multi-media file download. By so allocating the request, the higher downlink bandwidth from the satellite network for download may be used for the responsive multi-media file download without any other negotiation required between the remote communication terminal 105 and the satellite network access point 120. The remote communication terminal 105 may further re-allocate received communication data to the central office 130 or other network responsive to determining that the received communication data from the user endpoint device 107 has a low latency tolerance.

In further embodiments of the present invention, the load analysis module 262 may be configured to determine the characteristics of the received communication data by detecting the characteristic based on implicit information and/or explicit information. Detecting characteristics based on explicit information may include detecting known packet markings of the received communication data, detecting Ethernet priority bits of the received communication data, detecting internet protocol (IP) differentiated class of service code points of the received communication data and/or detecting locally significant code points of the received communication defined by the remote communication terminal 105. Detecting the characteristics based on implicit information, may include identifying flaws, spacing of packets and/or detecting packet rates of the received communication data.

The network monitor module 255 Is configured to monitor availability and characteristics of networks that may be used for routing of the communications to and from the local user endpoint devices 107. For example, dynamically re-allocating routing in the routing module 250 may be responsive to a determination of bandwidth availability on respective networks over links 122, 132, 142 and the network monitor module 255 may detect a change in the bandwidth availability over the respective network links 122, 132, 142. Furthermore, the network monitor module 255 may dynamically identify availability and/or loss of access to respective networks and further identify available alternative networks available in the locality of the remote communication terminal 105 and communicatively connect the terminal 105 to the identified alternative network responsive to loss of access to one or more other communication network access points.

The user history data 260 may include information regarding characteristics of the respective user endpoint devices 107 either predetermined and provided to the remote communication terminal 105 for storage in the user history data 160 or developed and saved by the remote communication terminal 105 based on communication data routed by the remote communication terminal 105 from respective ones of a plurality of user endpoint devices 107 in the locality over time. In other words, the load analysis module 262 may generate information defining usage characteristics of the user endpoint devices 107 based on communication data received from the user endpoint devices 107 over time, store such generated information in the user history data 260 and subsequently retrieve data stored in the user history data 260 to define the usage characteristics of an identified user endpoint device 107 associated with communication data received for routing at the remote communication terminal 105.

Each of the modules 262, 250, 255 stored in the memory 236 may be executed by the processor 238 and may use the user history data 260, which is also available to the processor 238.

While shown as resident in the memory 236 in the embodiments of FIG. 2 it will be understood that the respective database and module features, including the load analysis module 262, the routing module 250 and/or the network monitor module 255 may be implemented, for example, as part of the operating system, as application programs, as components of a dynamic link library or the like of the data processing system 234 so as to be executed in whole or in part by the processor 238. Accordingly, the particular groupings illustrated in FIG. 2 are solely for the purposes of explanation of embodiments of the present invention.

Computer implemented methods of dynamic communication data routing by the remote communication terminal 105 across a plurality of networks will now be described with reference to the flowchart illustrations of FIGS. 3-6. Referring first to the embodiments illustrated in the flowchart of FIG. 3, operations begin with delivering the multi-network remote communication terminal 105 to a locality designated to receive communication services (block 300). The terminal 105 is communicatively connected to a first network, such as through the satellite network access point 120 (block 310). The terminal 105 is further communicatively connected to a second network, such as through the terrestrial wireless network access point 140 or the central office 130 (block 320). The second network has communication characteristic(s) different from the first network. The terminal 105 is further communicatively connected to one or more user endpoint devices 107 positioned in the locality of the block terminal 105 (block 330).

Communication data directed to a target device(s) is received at the terminal 105 from one or more of the user endpoint devices 107 (block 340). A characteristic of the received communication data is determined, for example, by the load analysis module 262 (block 350). Routing of received communication data to the target device(s) is allocated, for example, by the routing module 250, across the first network and/or the second network based on the determined characteristic of the received communication data and communication characteristics of the first and second network (block 360). In some embodiments, operations at block 360 include, or are preceded by, for example, the routing module 250 grouping data from different ones of the plurality user endpoint devices 107 based on determined characteristics of the communication data from respective ones of the plurality of user endpoint devices 107. Routing of the received communication data is dynamically re-allocated by, for example, the routing module 250, based on a detected change in the characteristic of the communication data (block 370).

Figure 4:
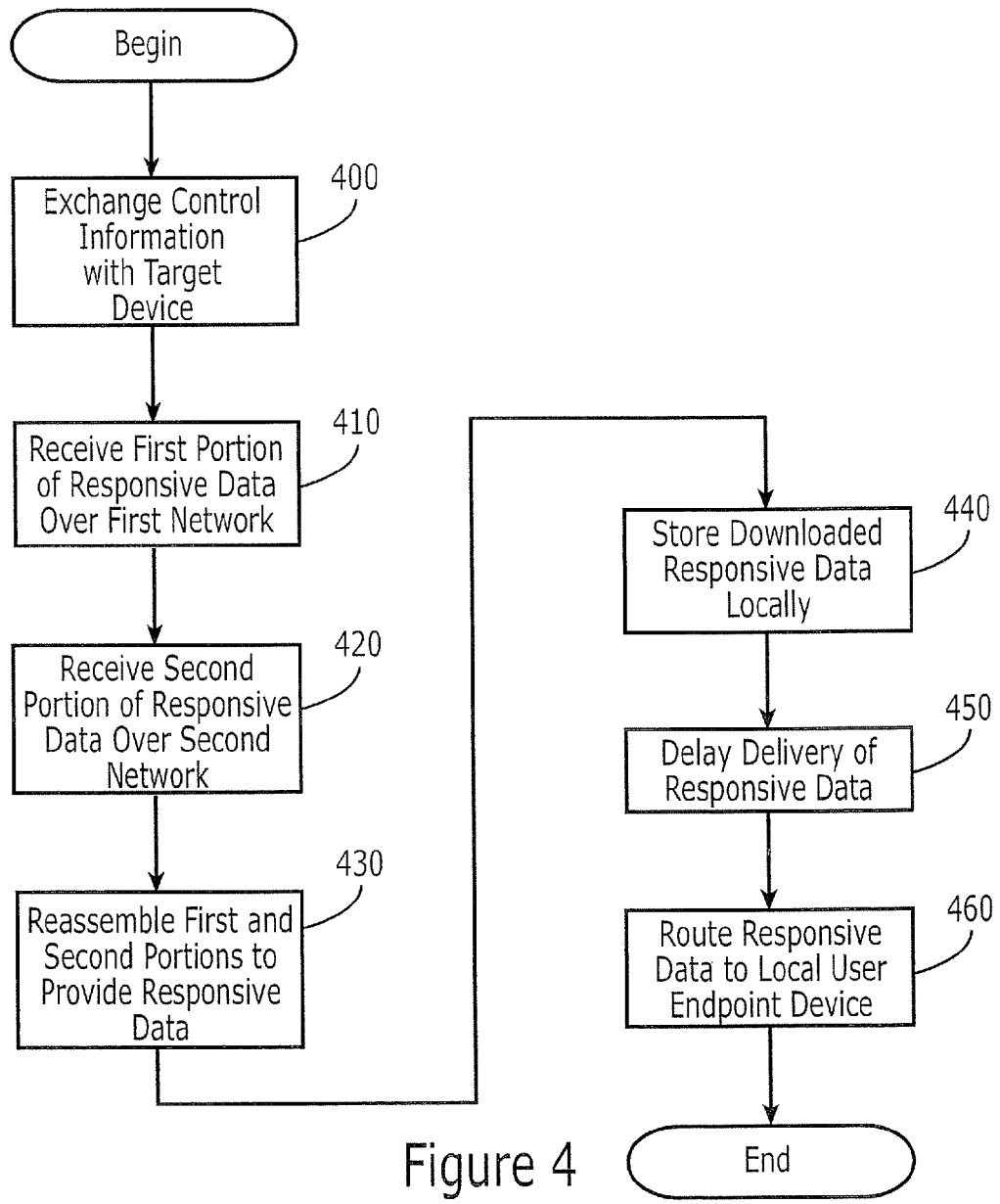

Operations according to further embodiments of the present invention will now be described with reference to the flowchart illustration of FIG. 4. As shown in the embodiments of FIG. 4, operations begin at block 400 with the terminal 105 exchanging control information with the target device to allocate the flow of communication data sent to the user endpoint device 107 responsive to transmission of communication data from the user endpoint device 107 over the first and/or second network. The control information may select routing based on communication characteristics of the first and second network and characteristics of the flow of the communication data sent to the user endpoint device 107. In other words, for example, the remote terminal 105 could request download of a responsive multi-media file using the high bandwidth satellite downlink 122. Such a responsive communication path may be selected even where the original request for download of the multi-media file is sent on an uplink through another network, such as through the terrestrial wireless network access point 140 on the link 142. It will be further understood that the target device itself may be engaged in the control information exchange with the terminal 105 and/or a separate processor device on the target device side of the communication link may carry out the control exchange with terminal 105.

Operations related to receiving downloaded communications at the terminal 105 will now be described with reference to blocks 410-430. It will be understood that the downloaded received communication data may be a multi-media file or other downloaded data. A first portion of responsive communication data is received at the terminal 105 over the first network (block 410). A second portion of the responsive communication data is received at the terminal 105 over the second network (block 420). The first and second portions are reassembled by the terminal 105 to provide the responsive communication data (block 430). While, as described above, a responsive communication is received over multiple networks, it will be understood that in further embodiments of the present invention, the entire responsive communication may be downloaded using a single common communication network, in which case reassembly of respective portions may or may not be required at the remote terminal 105.

For the embodiments illustrated in FIG. 4, rather than directly routing a received downloaded data to a user endpoint device 107, the received downloaded data, such as a multi-media file download, is stored on the storage device 150 of the terminal 105 (block 440). Delivery of the received and stored multi-media file to the user endpoint device 107 is delayed to allow delivery to the user endpoint device 107 at a communication rate exceeding the download rate of the multi-media file on the first network (block 450). The received data is routed to the user endpoint device 107 (block 460). It will be understood that, in other embodiments, the operations at block 440 and 450 may not be utilized and the received data may be routed to the intended respective user endpoint device 107 as received from the target device at the terminal 105 and/or delivery may be delayed after storage to a set time in the future.

Figure 5:
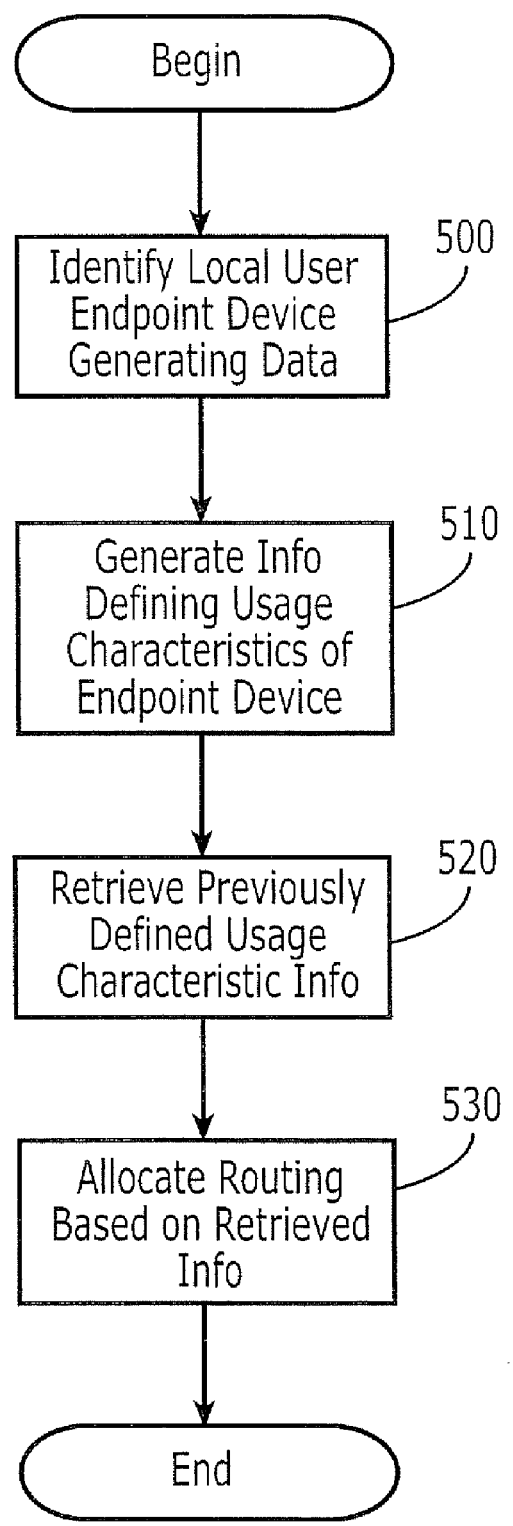

Further embodiments of the present invention will now be described with reference to the flowchart illustration of FIG. 5. As shown in the embodiments of FIG. 5, operations begin at block 500 by the remote communication terminal 105 identifying the particular user endpoint device 107 generating the communication data (block 500). Information defining the usage characteristics of the user endpoint device is generated, for example, by the load analysis module 262, based on communication data received from the user endpoint device 107 over time (block 510). Previously defined information defining the usage characteristics of the identified user endpoint device is retrieved, such as from the user history data 260 (block 520). Routing is allocated, for example, by the routing module 250, based on the retrieved previously defined information (block 530).

Figure 6:
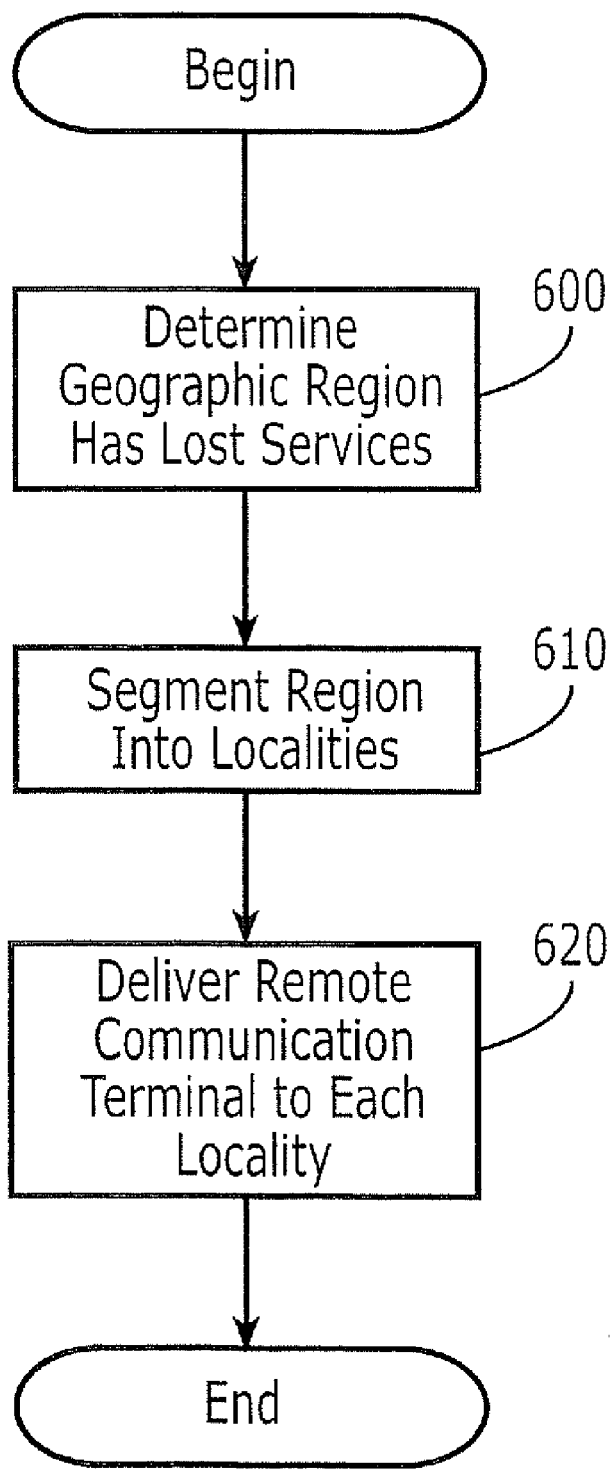

Yet further embodiments of the present invention will now be described with reference to the flowchart illustration of FIG. 6. In particular, the operations to be described with reference to FIG. 6 correspond to embodiments of carrying out the operations described with reference to block 300 of FIG. 3. A geographic region that has had a loss of communication services is determined by a service provider, government authority and/or the like (block 600). For example, following a hurricane it may be determined that various rural areas in the affected region have lost access to wide area network access points. The determined geographic region is segmented by the service provider, government authority and/or the like into a plurality of localities, each of which is sized to be serviced by a single multi-media remote communication 105 (block 610). A multi-media network remote communication terminal 105 is delivered to each of the localities (block 620). For example, in some embodiments where access to the affected geographic region is limited, the remote communication terminals 105 may be delivered by parachute drop or the like.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of dynamic communication data routing by a multi-network remote communication terminal across a plurality of networks, the method comprising:

delivering the multi-network remote communication terminal to a locality to receive communication services;

communicatively connecting the terminal to a first network;

communicatively connecting the terminal to a second network, the second network having a communication characteristic different from the first network;

communicatively connecting the terminal to a user endpoint device positioned in the locality;

receiving communication data directed to a target device from the user endpoint device at the terminal;

determining a characteristic of the received communication data;

allocating routing of received communication data to the target device across the first network and/or the second network based on the determined characteristic of the received communication data and the communication characteristics of the first and second network; and dynamically re-allocating routing of the received communication data based on a detected change in the characteristic of the communication data, wherein determining the characteristic of the received communication data comprises detecting the characteristic based on implicit information and/or explicit information, and wherein detecting the characteristic based on implicit and/or explicit information includes detecting the characteristic based on explicit information including detecting known packet markings of the received communication data, Ethernet priority bits of the received communication data, internet protocol (IP) differentiated class of service code points of the received communication data and/or locally significant code points of the received communication data defined by the terminal.

2. The method of claim 1, wherein the first and second network comprise wireless networks and wherein the first network communication characteristics comprise a high downstream bandwidth from the target device to the user endpoint device, a low upstream bandwidth from the user endpoint device to the target device and a high latency and wherein the second network communication characteristics comprise a low upstream and downstream bandwidth and a low latency and wherein determining the characteristic of the received communication data comprises determining a latency tolerance and a bandwidth requirement of the received communication data.

3. The method of claim 2, wherein allocating routing comprises routing a request for a multi-media file download from the user endpoint device to the target device to the first network responsive to determining that the received communication data comprises the request for a multi-media file download and wherein dynamically re-allocating comprises re-allocating the received communication data to the second network responsive to determining that the received communication data has a low latency tolerance.

4. The method of claim 2, wherein allocating routing comprises routing a request for a multi-media file download from the user endpoint device to the target device to the first network responsive to determining that the received communication data comprises the request for a multi-media file download, the method further comprising:
    receiving the requested multi-media file download from the target device on the first network; and
    routing the received multi-media file download to the user endpoint device.

5. The method of claim 4, wherein routing the received multi-media file download is preceded by storing the received multi-media file download on a memory device of the terminal and delaying delivery of the received multi-media file to the user endpoint device to allow delivery to the user endpoint device at a communication rate exceeding the download rate of the multi-media file on the first network.

6. The method of claim 1, wherein detecting the characteristic based on implicit and/or explicit information includes detecting the characteristic based on implicit information including detecting flow characteristics of packets of the received communication data and/or packet rates of the received communication data.

7. The method of claim 1, wherein determining the characteristic of the received communication data comprises:
    identify the user endpoint device generating the communication data;
    retrieving previously defined information defining the usage characteristics of the identified user endpoint device; and
    allocating routing based on the retrieved previously defined information.

8. The method of claim 7, wherein the method further comprises;
    generating information defining the usage characteristics of the user endpoint device based on communication data received from the user endpoint device over time; and
    wherein retrieving previously defined information comprises retrieving the generated information.

9. The method of claim 1, wherein dynamically re-allocating further comprises re-allocating routing of the received communication data responsive to a determination of bandwidth availability on the first and/or second network.

10. The method of claim 9, further comprising detecting a change in the bandwidth availability of the first and/or second network.

11. The method of claim 10, wherein detecting the change in the bandwidth availability comprises detecting loss of access to the first and/or second network and wherein the method further comprises:
    identifying an available alternative network in the locality; and
    communicatively connecting the terminal to the identified alternative network.

12. The method of claim 1, wherein communicatively connecting the terminal to the user endpoint device comprises communicatively coupling the terminal to a plurality of user endpoint devices positioned in the locality and wherein receiving communication data comprises receiving communication data from the plurality of user endpoint devices.

13. The method of claim 12, wherein allocating routing is preceded by grouping data from different ones of the plurality of user endpoint devices based on determined characteristics of the communication data from respective ones of the plurality of user endpoint devices.

14. The method of claim 1, further comprising the terminal exchanging control information with the target device to allocate the flow of communication data sent to the user endpoint device responsive to transmission of the communication data from the user endpoint device to the first and/or second network based on the communication characteristics of the first and second network and characteristics of the flow of communication data sent to the user endpoint device responsive to transmission of the communication data from the user endpoint device.

15. The method of claim 1, further comprising:
    receiving a first portion of responsive communication data at the terminal over the first network;
    receiving a second portion of the responsive communication data at the terminal over the second network;
    reassembling the first and second portions to provide the responsive communication data; and
    transmitting the responsive communication data from the terminal to the user endpoint device.

16. A method of dynamic communication data routing by a multi-network remote communication terminal across a plurality of networks, the method comprising:
    delivering the multi-network remote communication terminal to a locality to receive communication services;
    communicatively connecting the terminal to a first network;
    communicatively connecting the terminal to a second network, the second network having a communication characteristic different from the first network;
    communicatively connecting the terminal to a user endpoint device positioned in the locality;
    receiving communication data directed to a target device from the user endpoint device at the terminal;
    determining a characteristic of the received communication data;
    allocating routing of received communication data to the target device across the first network and/or the second network based on the determined characteristic of the received communication data and the communication characteristics of the first and second network; and dynamically re-allocating routing of the received communication data based on a detected change in the characteristic of the communication data, wherein delivering the multi-network remote communication terminal includes:

determining a geographic region has had a loss of communication services;

segmenting the geographic region into a plurality of localities, each of which is sized to be serviced by a single multi-network remote communication terminal; and delivering a multi-network remote communication terminal to each of the localities.

17. A computer program product for dynamic communication data routing across a plurality of networks by a multi-network remote communication terminal delivered to a locality to receive communication services, comprising:

a computer readable storage medium having computer readable program code embodied therein, the computer readable program code comprising:

computer readable program code configured to communicatively connect the terminal to a first network;

computer readable program code configured to communicatively connect the terminal to a second network, the second network having a communication characteristic different from the first network;

computer readable program code configured to communicatively connect the terminal to a user endpoint device positioned in the locality;

computer readable program code configured to receive communication data directed to a target device from the user endpoint device at the terminal;

computer readable program code configured to determine a characteristic of the received communication data;

computer readable program code configured to allocate routing of received communication data to the target device across the first network and/or the second network based on the determined characteristic of the received communication data and the communication characteristics of the first and second network; and computer readable program code configured to dynamically re-allocate routing of the received communication data based on a detected change in the characteristic of the communication data, wherein the computer readable program code configured to determine the characteristic of the received communication data comprises computer readable program code configured to detect the characteristic based on implicit information and/or explicit information by detecting the characteristic based on explicit information including detecting known packet markings of the received communication data, Ethernet priority bits of the received communication data, Internet protocol (IP) differentiated class of service code points of the received communication data and/or locally significant code points of the received communication data defined by the terminal.

* * * * *